Aug. 30, 1966 J. T. LINDQUIST 3,269,215
SAFETY MECHANISM
Filed Oct. 15, 1964 6 Sheets-Sheet 1

INVENTOR.
JONAS THEODORE LINDQUIST
BY Edward C. Threedy
HIS ATTORNEY.

INVENTOR
JONAS THEODORE LINDQUIST
BY Edward C. Kneedy
HIS ATTORNEY.

INVENTOR.
JONAS THEODORE LINDQUIST
BY Edward C. Threedy
HIS ATTORNEY.

INVENTOR.
JONAS THEODORE LINDQUIST
BY Edward C. Threedy
HIS ATTORNEY.

Aug. 30, 1966 J. T. LINDQUIST 3,269,215

SAFETY MECHANISM

Filed Oct. 15, 1964 6 Sheets-Sheet 5

INVENTOR.
JONAS THEODORE LINDQUIST
BY Edward C. Threedy
HIS ATTORNEY.

Aug. 30, 1966 J. T. LINDQUIST 3,269,215

SAFETY MECHANISM

Filed Oct. 15, 1964 6 Sheets-Sheet 6

INVENTOR.
JONAS THEODORE LINDQUIST

Edward C. Threedy

HIS ATTORNEY.

3,269,215
SAFETY MECHANISM

Jonas Theodore Lindquist, 7654 Tripp Ave., Skokie, Ill.
Filed Oct. 15, 1964, Ser. No. 403,997
8 Claims. (Cl. 74—612)

My invention relates to a safety mechanism for use in connection with various presses and other apparatuses such as the conventional metal bending and forming apparatuses.

An object of the invention is to provide a safety mechanism which will afford the maximum protection to the operator of the apparatus; one which is instantaneously operated to dispose a guard in position to protect the hands of the operator and one which may be manufactured and sold without materially increasing the cost of the conventional metal bending and forming apparatus or other machine.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
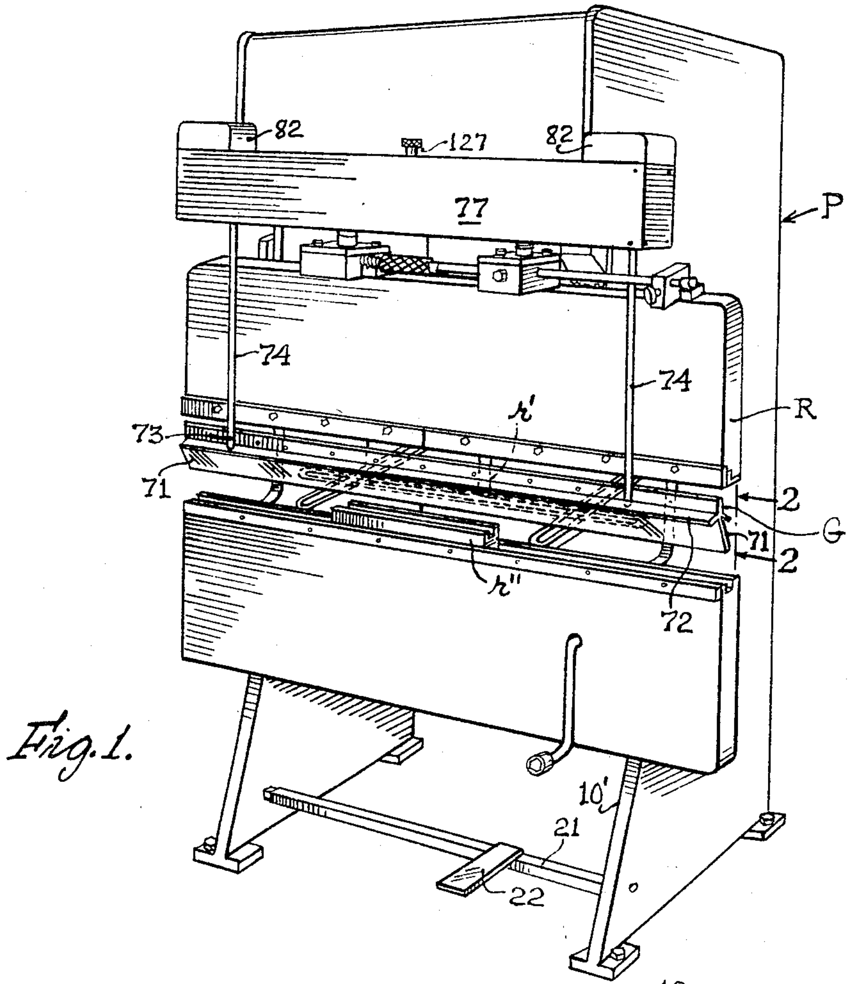
FIG. 1 is a perspective view of a conventional apparatus with which my invention is adapted to be associated.

To accomplish the several and salient objects of my invention, I provide a mounting plate 10 fixedly secured to a wall 10' of the apparatus P. The mounting plate 10 has a reduced portion 11 on which is mounted an electromagnetic solenoid 12 having a plunger 13. Pivotally connected as at 14 to the mounting plate 10 is one leg 15 of a substantially V-shaped lever 16. To the apex portion 17 of the lever 16 is pivotally connected as at 18 a down rod 19. The lower end portion of this rod 19 is pivotally connected to a lateral arm 20 of a treadle rod 21 having a foot pedal 22. The treadle rod 21 is a conventional part of a conventional metal bending and forming apparatus.

Figures 3, 6, 7:
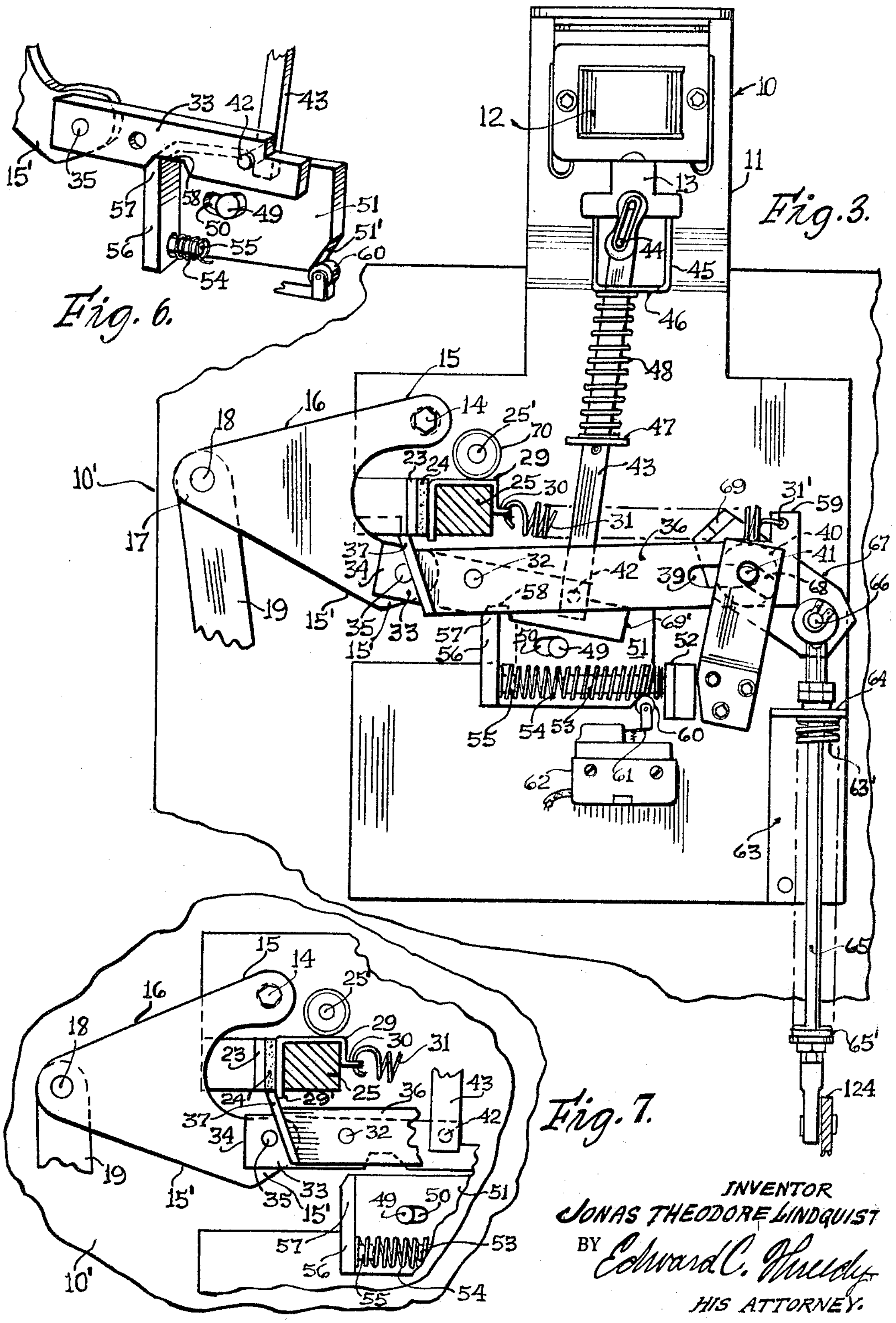
FIG. 3 is an elevational view of the mechanism for actuating a guard switch and a clutch rod of the apparatus with which my invention is associated.
FIG. 6 is a fragmentary perspective view of a blocking plate and its latch.
FIG. 7 is a fragmentary elevational view similar to FIG. 5 but showing the parts thereof in different positions.

On the plate 10 is fixedly secured a lug 23 having an angled end portion to which is secured in any suitable manner a cushion plate 24 to absorb the shock of a clutch bar 25 disposed in relation thereto as shown in FIG. 3. This clutch bar 25 is, like the treadle rod 21, a conventional part of the conventional bending or forming apparatus.

The clutch bar 25 serves to actuate a clutch disc 26 of a clutch 27 to effect movement of a ram R of the metal bending or forming apparatus P. Only so much of the clutch 27 is illustrated as is deemed necessary for an understanding of the invention. Mounted to fixedly embrace the end portion 28 of the clutch bar 25 is a clip 29 having a laterally extending portion 30 to which one end portion of a spring 31 is attached.

Pivotally carried by the plate 10 as at 32 is a latch bar 33 having one end portion 34 pivotally connected as at 35 to the leg 15' of the lever 16.

An elongated pull plate is indicated at 36 and is normally arranged in coplanar spaced relation with respect to the plate 10 in a substantially horizontal plane in the direction of its length. Adjacent the left-hand portion of the plate 36 as shown in FIG. 3, the plate is by means of the pivot 32 pivotally connected to the latch bar 33, for longitudinal movement therewith. This end portion of the plate 36 has a laterally extending angled end portion 37 extending transversely and diagonally with respect to the long axis of the plate 36 with an edge portion extending above the top edge of the plate 36 to provide a lip 38 adapted for engagement with the depending edge portion 29' of the clip 29. The opposite end of the plate 36 has an elongated longitudinally extending slot 39 formed therein. Projecting through this slot 39 and through a spacing sleeve 40 is a pintle 41, the pintle being fixedly secured to the plate 10.

The latch bar 33 has pivotally secured thereto as at 42 one end portion of a link 43, the opposite end portion of which link is pivotally connected as at 44 to the solenoid 13. A U-shaped bracket 45 is fixedly secured to the plate 10 and is provided in its bight portion with an elongated slot 46 through which the link 43 projects. Between a pin-held disc 47 on the link 43 and the bracket 45 is a spring 48, which normally functions to urge the solenoid plunger 13 into its outwardly projected position when the solenoid 12 is deenergized.

The plate 10 carries a laterally extending stud shaft 49 which projects through an elongated slot 50 formed in a blocking plate 51 arranged in coplanar spaced relation with respect to the plate 10 and movable in opposite directions with respect to its length.

An angled lug 52 is secured to the plate 10 and has extending therefrom in a horizontal plane a stud shaft 53 embraced by one end portion of a spring 54. The other end portion of the spring 54 embraces a pin 55 carried by the angled end portion 56 of the blocking plate 51. The top edge portion 57 of the angled end portion 56 of the blocking plate 51 normally engages in a notch 58 formed in the latch bar 33. The opposite end portion of the spring 31 is connected as at 31' to a lateral extension 59 of the pull plate 36.

The blocking plate 51 has a tapered corner portion 51' which normally engages a roller 60 carried by a movable actuating lever 61 of a cam-actuated snap switch 62. This switch 62 is of a conventional structure and is of the well-known micro switch type. The switch per se constitutes no part of the present invention.

Secured to the mounting plate 10 in the lower right-hand corner as viewed in FIG. 3, is a guide plate 63 having a horizontally extending angled upper end portion 64 through which movably projects a connecting rod 65. The rod 65 carries a fixed stop 65'. Arranged between the stop 65' and the angled end portion 64 of the plate 63 is a spring 63' which normally functions to urge the rod 65 in a downward direction. The upper end portion of the connecting rod 65 is pivotally connected as at 66 to the lower end portion of a kick-out plate 67. This kick-out plate 67 is arranged to the rear of the spacer sleeve 40 and has an elongated slot 68 formed therein through which the pintle 41 projects. At its opposite upper end portion the kick-out plate 67 has an angled portion 69 which is adapted (as explained hereinafter) to engage the adjacent end portion 69' of the latch bar 33 when the kick-out plate is pivoted about the pintle 41.

Mounted on the plate 10 above the clutch bar 25 is a stud shaft 25' on which is mounted a roller 70 in guiding engagement with the clutch bar 25.

Figures 8, 9, 10:
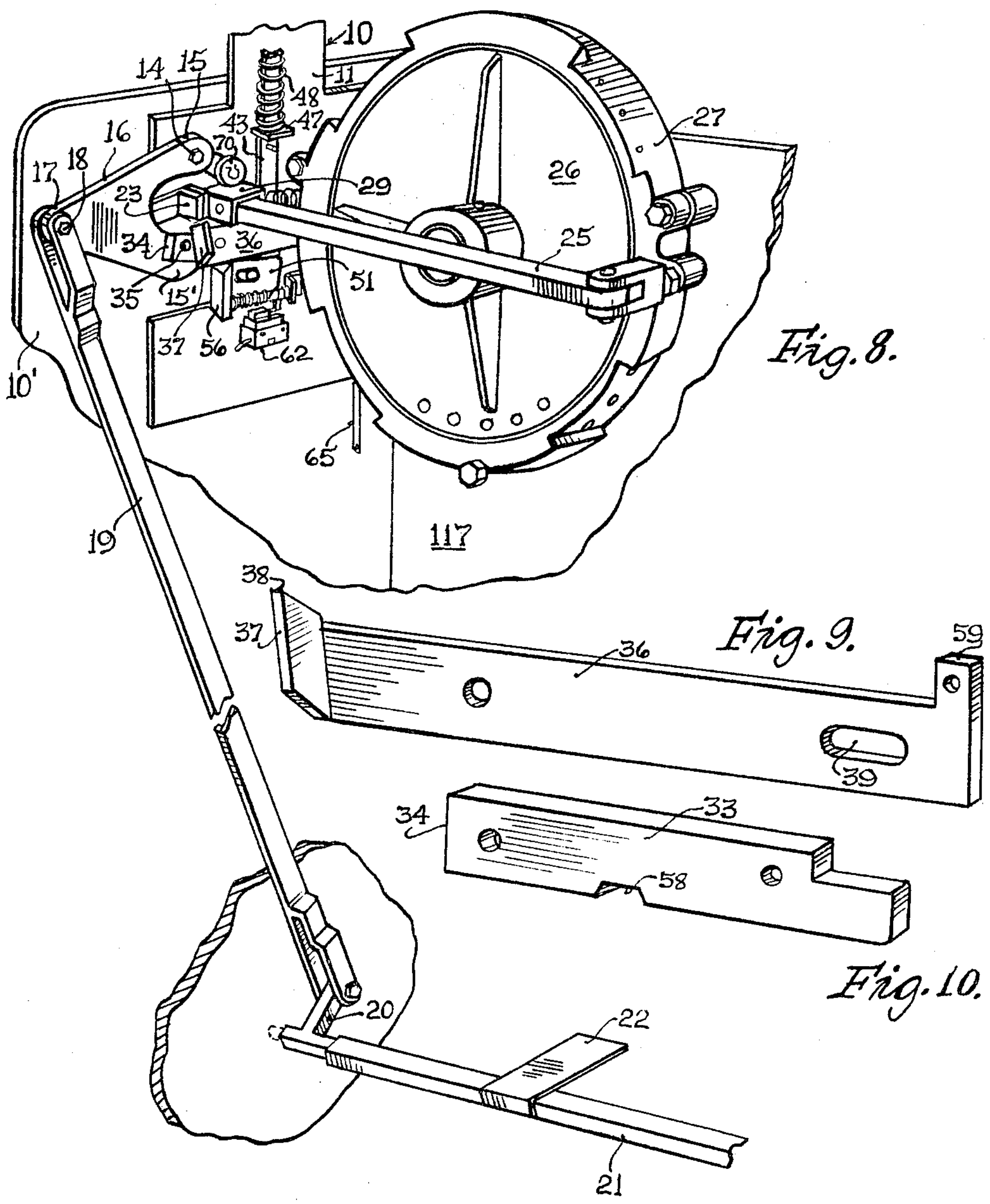
FIG. 8 is a fragmentary perspective view showing the mechanism associated with a clutch and treadle of the apparatus with which the invention is associated.
FIG. 9 is a perspective view of a pull plate embodied in the invention.
FIG. 10 is a perspective view of a latch bar embodied in the invention.
Figure 11:
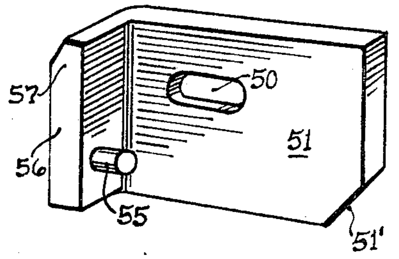
FIG. 11 is a perspective view of a blocking plate embodied in the invention.
Figures 12, 13:
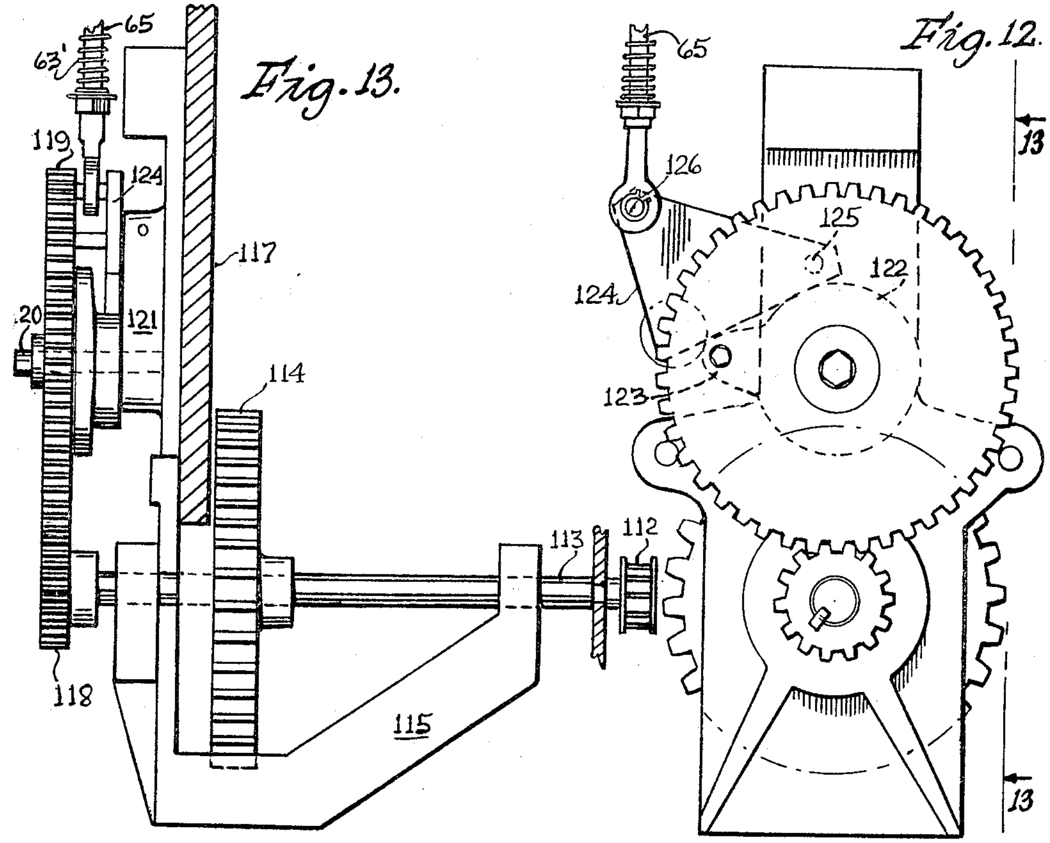
FIG. 12 is an elevational view of a cam assembly embodied in the invention.
FIG. 13 is a fragmentary sectional detail view of the cam assembly shown in FIG. 12, taken substantially on line 13—13 of FIG. 12.
Figures 14, 15:
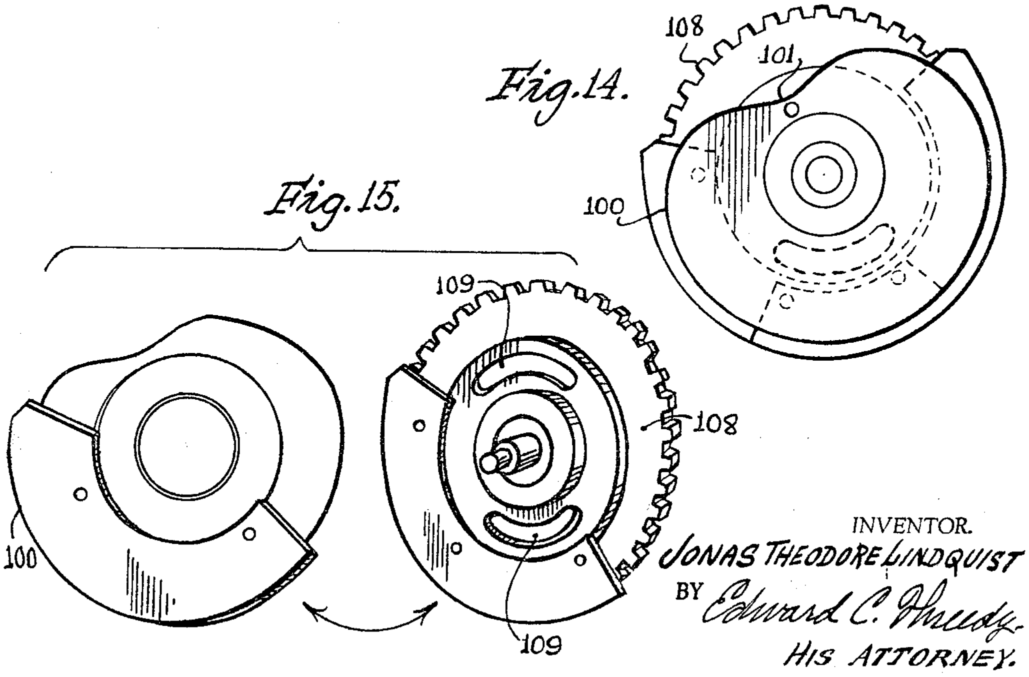
FIGS. 14 and 15 are elevational and perspective views of a cam assembly embodied in my invention.

When the operator places his foot upon the foot pedal 22 (FIGS. 1 and 8) he will rock the treadle rod 21 in a clockwise direction. This action will exert a downward pull on the down rod 19, resulting in initially pivoting the lever 16. In this initial pivotal movement of the lever 16 in an anticlockwise direction as viewed in FIG. 3, the latch bar 33 will move in a direction to engage the wall of the notch 58 with the edge portion 57 of the angled end portion 56 of the blocking plate 51. This action will impart a horizontal movement to the blocking plate 51 so as to cause the cam edge 51' thereof to bear down on the movable actuating lever 61 of the switch 62, closing the latter to set up a circuit to the electromagnetic solenoid 12 in a manner hereinafter described.

When the solenoid 12 is energized, the plunger 13 will be drawn inwardly, pivoting the latch bar 33 and the pull plate 36 in an upward direction to disengage the latch bar 33 from the blocking plate 51 and disposing the lip portion 38 of the bar 33 to the rear of the clutch bar 25 in a position where further pivotal movement of the lever 16 in an anticlockwise direction, as viewed in FIG. 3, by downward movement of the rod 19 will move the clutch bar 25 in a direction to exert movement to the clutch disc 26 whereby to condition the clutch 27 to operate the ram R of the apparatus P.

Figures 4, 5:
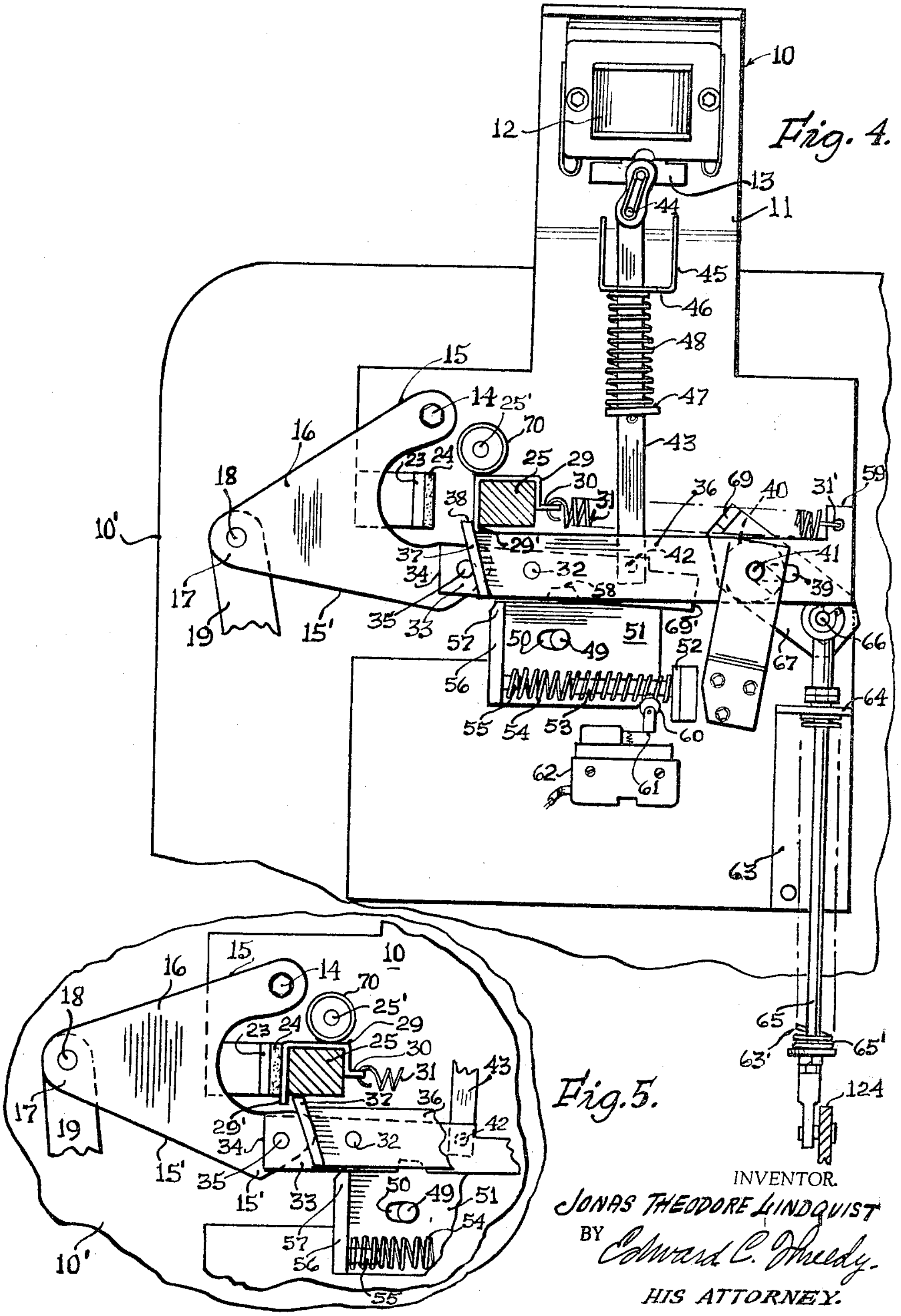
FIG. 4 is an elevational view similar to FIG. 3 but showing the parts thereof in different positions.
FIG. 5 is a fragmentary elevational view similar to FIG. 4 but showing the parts thereof in different positions.

In the normal operation of the apparatus P, at the end of the cycle of operation of the ram R the electromagnetic solenoid 12 is deenergized, allowing the plunger 13 to project outwardly in a direction against the action of the spring 48, to move the link 43 downwardly to position the latch bar 33 in a position to re-establish latched relation with the blocking plate 51, and the return of the pull plate 36 to its original starting position. In this position, upon removal of pressure on the foot pedal 22 the clutch bar 25 will return to its original starting position, the spring 54 acting to move the blocking plate 51 back to its original starting position. Should, however, there result an electrical failure which prevents movement of the plunger 13 to its outwardly projecting position, or should the plunger 13 for any reason fail to return to its normal position, the rod 65, being moved outwardly in a manner hereinafter described, against the action of spring 63', will pivot in an anticlockwise direction as viewed in FIG. 4 into bearing engagement with the end 69' of the latch plate 33, thereby to force the plunger 13 downwardly, permitting the parts to return to their normal positions (FIG. 3) hereinbefore described.

The guard G, as illustrated in FIG. 1, comprises two elongated transparent sheets 71 hingedly connected as at 72 along their long edges. The upper of the two sheets 71 is fixedly connected in any suitable manner to the lower end portions 73 of vertically extending rods 74, the upper ends of which extend through bearings 75 carried by the bottom wall 76 of a housing 77. Each of the upper end portions 78 of the rods 74 is fixedly connected to the lower end portions of abutting leaf springs 79 which project up through a sleeve 80 with their opposite end portions coiled upon themselves and fixedly secured to pins 81 carried by a case 82 in turn carried by the housing 77.

To the upper end portions of the rods 74 are pivotally secured as at 83 the outer end portions of a toggle T comprising levers 84 and 85 pivotally connected at their adjacent end portions by a slot and pin connection 86, the pin of the connection serving as a latch pin. When the levers 84 and 85 of the toggle T are in the position shown in FIG. 16, which position is guard-elevated position, the pin and slot connection 86 has latched engagement with a latch arm 87 pivoted as at 88 to a mounting plate 89 secured to a wall of the housing 77. The lever 84 intermediate its end portions is pivoted as at 90 to a bracket 91 carried by the housing 77. The lever 85 intermediate its end portions is pivoted as at 92 to a link 93 intermediate the latter's opposite end portions. One end portion of the link 93 has connection to a spring 94 which is in turn connected as at 95 to the housing 77.

The latch arm 87 by a link 87' is connected to the plunger 96 of an electromagnetic solenoid 97. The end portion 98 of the link 93 carries a roller 99 which operatively engages a cam 100, the cam having a valley 101 for reasons hereinafter set forth.

The upper end portion of each of the rods 74 carries a plate 102 having its intermediate portion bent vertically to provide horizontally extending portions 103 and 104, the portion 104 being connected to the upper end portions 78 of the rods 74. This portion carries a dash pot 105, the purpose and function of which is to cushion the drop of the guard G as the guard is dropped by gravity in a manner hereinafter set forth. The horizontal portion 103 is adapted to engage and actuate a plunger 106 of a snap-action switch 107, the purpose and function of which is hereinafter set forth.

The cam 100 is carried by a gear 108 and is adjustably connected thereto by means of bolt and slot connections 109, the arrangement being such that the cam may be adjusted circumferentially with respect to the gear to properly adjust the cam with respect to the roller for the purposes hereinafter set forth.

The gear 108 by a shaft 110 is carried by the housing 77 and is drivingly connected by a chain 111 to a sprocket gear 112 mounted on a shaft 113 having a gear 114 fixedly secured thereto and which operatively meshes with the ram-driving gear (not shown) of the apparatus P. The shaft 113 is supported by a bearing bracket 116 which is secured to a wall 117 of the apparatus P with which the invention is associated. On this shaft 113 is fixedly mounted a pinion 118 operatively meshing with a gear 119 fixedly mounted on a shaft 120 journaled in a bearing 121 carried by the wall 117. On this shaft 120 is a disc 122 having a cam finger 123 which is adapted to engage a plate 124 pivoted as at 125 to the bearing 121. To this plate 124 is pivotally secured as at 126 the rod 65 hereinbefore referred to.

Figures 16, 17:
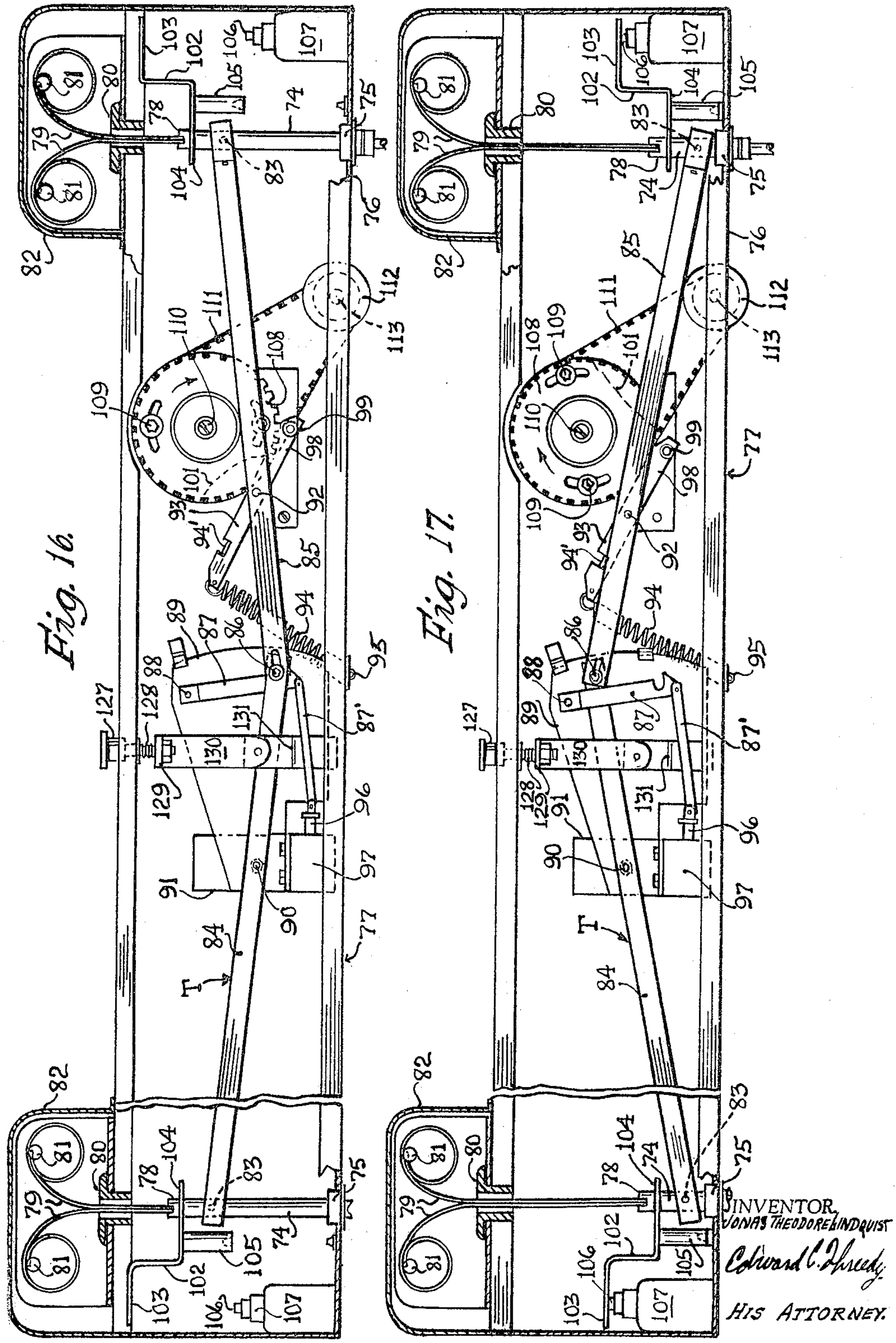
FIG. 16 is an elevational view of the guard actuating mechanism embodied in my invention, in elevated position.
FIG. 17 is a view similar to FIG. 16 but showing the guard actuating mechanism in lowered position.

Carried by the housing 77 is a thumb nut 127 having a threaded shank portion 128 connected as at 129 to a link 130 having a horizontally offset portion 131 disposed as shown in FIG. 17 beneath the lever 84.

By adjusting the link 130 vertically with respect to the housing 77, the horizontally extending portion of the link 130 may be elevated to vary the distance of drop of the guard G.

The operation of the guard G is as follows: Such guard is released to drop into guarding position with respect to the ram R and dies *r'* and *r''* of the apparatus P (FIG. 1), substantially simultaneously with the operator's initial pressure on the foot pedal 22 results in the closing of a starting switch 131' which establishes a circuit to the solenoid 97 (FIGS. 16 and 17). When the solenoid 97 is thus energized, the latch arm 87 through the linkage 87' is pivoted in an anticlockwise direction as viewed in FIGS. 16 and 17 from latched engagement with the pin of the pin and slot connection 86 providing the pivotal connection between the levers 84 and 85 of the toggle T.

Figure 2:
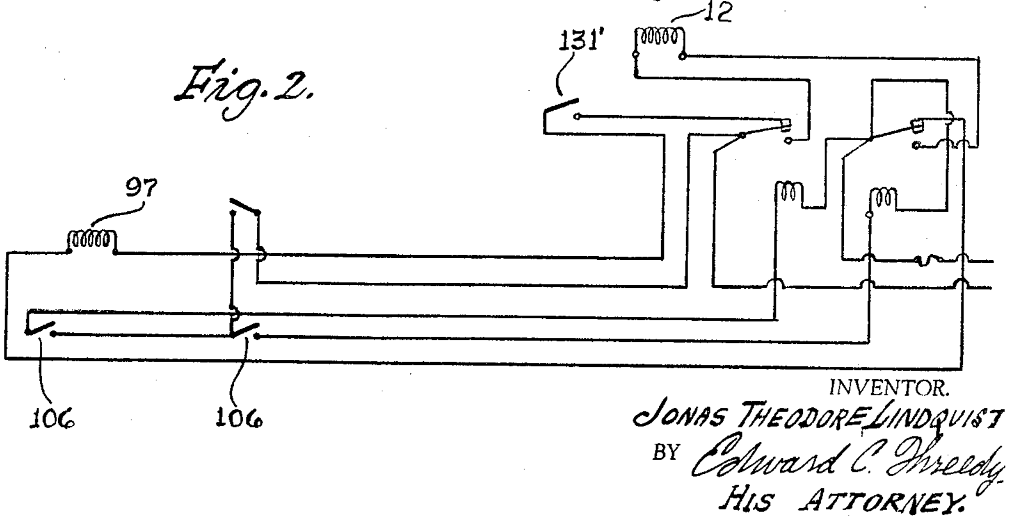
FIG. 2 is a schematic diagram of a circuit employed in the invention.

Upon unlatching of the toggle T, the guard G will drop by gravity into guarding position. Any undue shock which may result from the dropping of the guard G will be absorbed by the dash pots 105 and restraining springs 79 (FIGS. 16 and 17). Upon reaching the full extent of its drop, the horizontal portions 103 provided by the plate 102 will engage the plungers 106 of the switches 107, thus to establish a circuit to the solenoid 12 (FIG. 2), the function and operation of which solenoid has been hereinbefore set forth.

The gear 108 having been rotating during this action, will cause the roller 99 to move into the cam valley 101 and, in doing so, the spring 94 will bear the lug 94' against the lever 85 (FIG. 17) and impart pivotal movement to the latter, which in turn will effect pivotal movement of the lever 84, with the resulting effect that the levers 84 and 85 will be pivoted to the position shown in FIG. 17, and thereby by reason of their connection with rods 74, reset the guard G in its elevated non-guarding position, in which position the latch arm 87 will have latched engagement with the pin of the connection 86 to releasably hold the guard G in elevated position until it is again released to drop by gravity in the manner hereinbefore stated. As heretofore mentioned, the distance of the drop of the guard G may be adjusted through the medium of the thumb screw 127.

A safety mechanism designed and constructed in accordance with the foregoing description will afford maximum protection to the operator when operating the apparatus with which it is associated. As is apparent herein, the slightest touch or obstruction to the guard will render inoperative the clutch and ram of the apparatus. The safety mechanism becomes instantly effective to present the guard G in guarding position upon a relatively slight pressure of the operator's foot on the foot pedal 22, as such pressure will effect the closing of the switch 62, establishing a circuit to the solenoid 97, resulting in the instant dropping of the guard G.

If the guard G is engaged either by the hand of the operator or some object, or if the operator has his foot on the foot pedal 22, the lip 38 of the pull plate 36 will be engaged in front of the depending overlapping edge portion 29' of the clip 29 carried by the clutch bar and thus prevent the clutch 27 from engaging to operate the ram R. When a condition of this sort exists, the electromagnetic solenoid 12 must be deenergized and the foot removed from the treadle 22 or the hand or object removed from contact with the guard G. Upon these conditions being remedied, when the electromagnetic solenoid 12 is energized, the safety device will operate in its normal expected capacity.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A safety device of the class described comprising
- (a) a mounting plate having a V-shaped lever attached thereto,
- (b) a manually operated treadle lever pivoted thereto,
- (c) a blocking member,
- (d) a slot and pin connection between the blocking member and the mounting plate,
- (e) a latch bar pivotally connected to one leg of the lever and having a notch formed therein for latched engagement with an edge of the blocking member,
- (f) a pull plate having pivotal connection with the latch bar intermediate the latter's end portions,

- (g) a slot and pin connection pivotally connecting one end portion of the pull plate to the mounting plate,
- (h) the opposite end portion of said pull plate having a laterally and upwardly extending angled end portion,
- (i) an electromagnetic solenoid carried by said mounting plate and having a plunger,
- (j) a link connection between said plunger and the latch bar for pivoting said latch bar relative to said pull plate and for pivoting said pull plate relative to its slot and pin connection when said solenoid is energized,
- (k) switch means engageable by said blocking member for establishing an electric circuit to said solenoid, in combination with
- (l) a pivoted clutch rod having means disposed in the path of movement of said angled end portion of said pull plate and adapted for engagement therewith when the pull plate is pivoted as aforesaid by said solenoid and said blocking member is unlatched from said latch bar,
- (m) and a movable guard also actuating said switch means when said treadle lever is manually operated.

2. A safety device of the class described comprising
- (a) a mounting plate having a V-shaped lever attached thereto,
- (b) a manually operated treadle lever pivoted thereto,
- (c) a blocking member,
- (d) a slot and pin connection between the blocking member and the mounting plate,
- (e) a latch bar pivotally connected to one leg of the lever and having a notch formed therein for latched engagement with an edge of the blocking member,
- (f) a pull plate having pivotal connection with the latch bar intermediate the latter's end portions,
- (g) a slot and pin connection pivotally connecting one end portion of the pull plate to the mounting plate,
- (h) the opposite end portion of said pull plate having a laterally and upwardly extending angled end portion,
- (i) an electromagnetic solenoid carried by said mounting plate and having a plunger,
- (j) a link connection between said plunger and the latch bar for pivoting said latch bar relative to said pull plate and for pivoting said pull plate relative to its slot and pin connection when said solenoid is energized,
- (k) switch means engageable by said blocking member for establishing an electric circuit to said solenoid,
- (l) means for pivoting said pull plate about its slot and pin connection independently of its movement by said solenoid, in combination with
- (m) a pivoted clutch rod having means disposed in the path of movement of said angled end portion of said pull plate and adapted for engagement therewith when the pull plate is pivoted as aforesaid by said solenoid and said blocking member is unlatched from said latch bar,
- (n) and a movable guard also actuating said switch means when said treadle lever is manually operated.

3. A safety device of the class described comprising
- (a) a mounting plate having a V-shaped lever attached thereto,
- (b) a manually operated treadle lever pivoted thereto,
- (c) a blocking member,
- (d) a slot and pin connection between the blocking member and the mounting plate,
- (e) a latch bar pivotally connected to one leg of the lever and having a notch formed therein for latched engagement with an edge of the blocking member,
- (f) a pull plate having pivotal connection with the latch bar intermediate the latter's end portions, (g) a slot and pin connection pivotally connecting one end portion of the pull plate to the mounting plate, (h) the opposite end portion of said pull plate having a laterally and upwardly extending angled end portion, (i) an electromagnetic solenoid carried by said mounting plate and having a plunger, (j) a link connection between said plunger and the latch bar for pivoting said latch bar relative to said pull plate and for pivoting said pull plate relative to its slot and pin connection when said solenoid is energized, (k) switch means engageable by said blocking member for establishing an electric circuit to said solenoid, (l) spring means for moving said blocking member in one direction when unlatched from said latch bar, in combination with (m) a pivoted clutch rod having means disposed in the path of movement of said angled end portion of said pull plate and adapted for engagement therewith when the pull plate is pivoted as aforesaid by said solenoid and said blocking members is unlatched from said latch bar, (n) and a movable guard also actuating said switch means when said treadle lever is manually operated.

4. A safety device of the class described comprising (a) a mounting plate having a V-shaped lever attached thereto, (b) a manually operated treadle lever pivoted thereto, (c) a blocking member, (d) a slot and pin connection between the blocking member and the mounting plate, (e) a latch bar pivotally connected to one leg of the lever and having a notch formed therein for latched engagement with an edge of the blocking member, (f) a pull plate having pivotal connection with the latch bar intermediate the latter's end portions, (g) a slot and pin connection pivotally connecting one end portion of the pull plate to the mounting plate, (h) the opposite end portion of said pull plate having a laterally and upwardly extending angled end portion, (i) an electromagnetic solenoid carried by said mounting plate and having a plunger, (j) a link connection between said plunger and the latch bar for pivoting said latch bar relative to said pull plate and for pivoting said pull plate relative to its slot and pin connection when said solenoid is energized, (k) switch means engageable by said blocking member for establishing an electric circuit to said solenoid, (l) means for pivoting said pull plate about its slot and pin connection independently of its movement by said solenoid, (m) spring means for moving said blocking member in one direction when unlatched from said latch bar, in combination with (n) a pivoted clutch rod having means disposed in the path of movement of said angled end portion of said pull plate and adapted for engagement therewith when the pull plate is pivoted as aforesaid by said solenoid and said blocking member is unlatched from said latch bar, (o) and a movable guard also actuating said switch means when said treadle lever is manually operated.

5. The safety device defined by claim 1 in which the slot and pin connection (element *g*) is a pivotal and sliding connection.

6. The safety device defined by claim 2 in which the slot and pin connection (elements *g* and *m*) is a pivotal and sliding connection.

7. The safety device defined by claim 3 in which the slot and pin connection (element *g*) is a pivotal and sliding connection.

8. The safety device defined by claim 4 in which the slot and pin connection (elements *g* and *m*) is a pivotal and sliding connection.

References Cited by the Examiner

UNITED STATES PATENTS 1,270,578 6/1918 Winters et al. ---------- 74—616

FOREIGN PATENTS 625,000 6/1949 Great Britain.

MILTON KAUFMAN, *Primary Examiner.*

WESLEY S. RATLIFF Jr., *Examiner.*